UNITED STATES PATENT OFFICE.

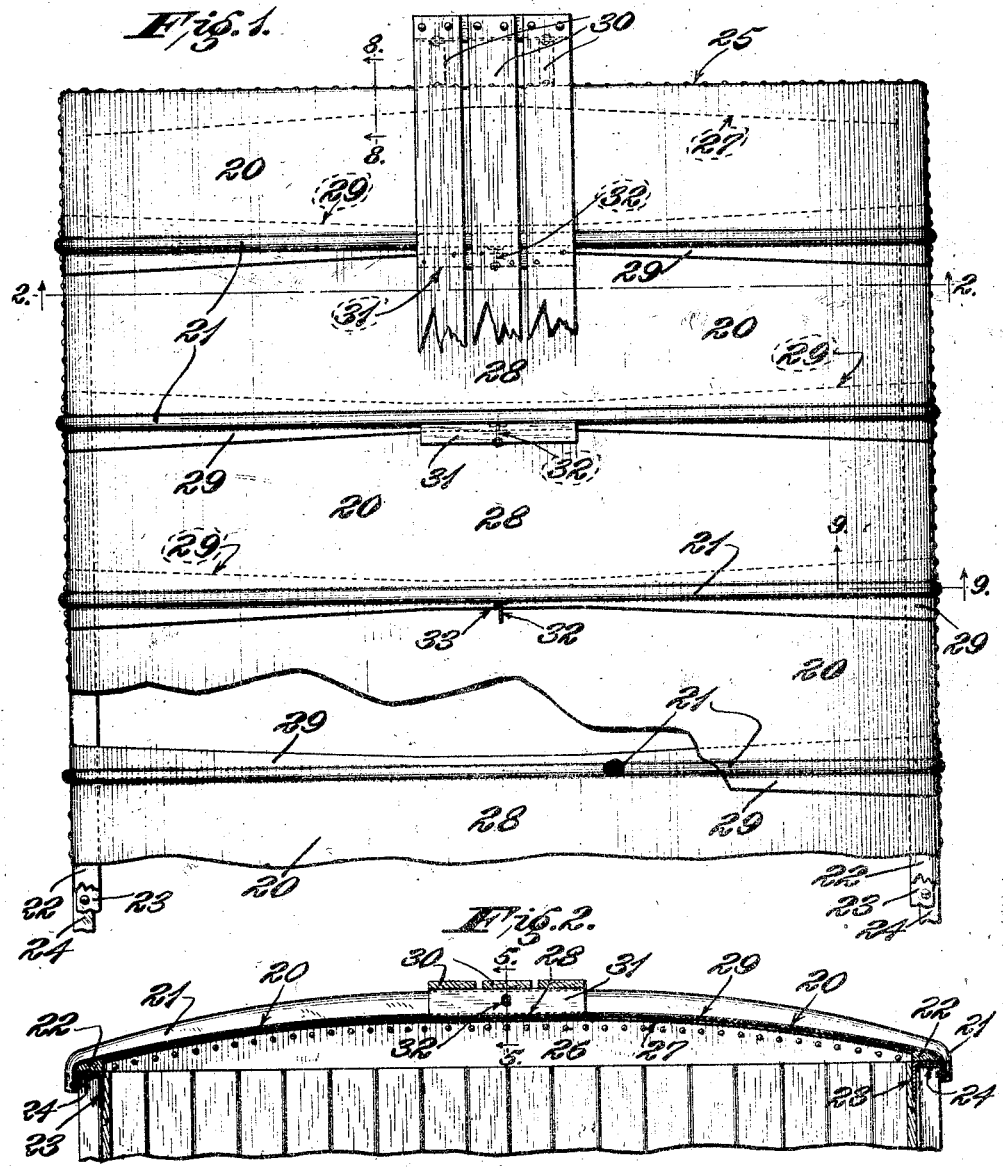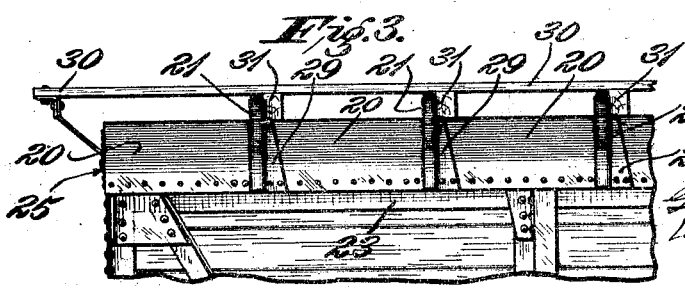

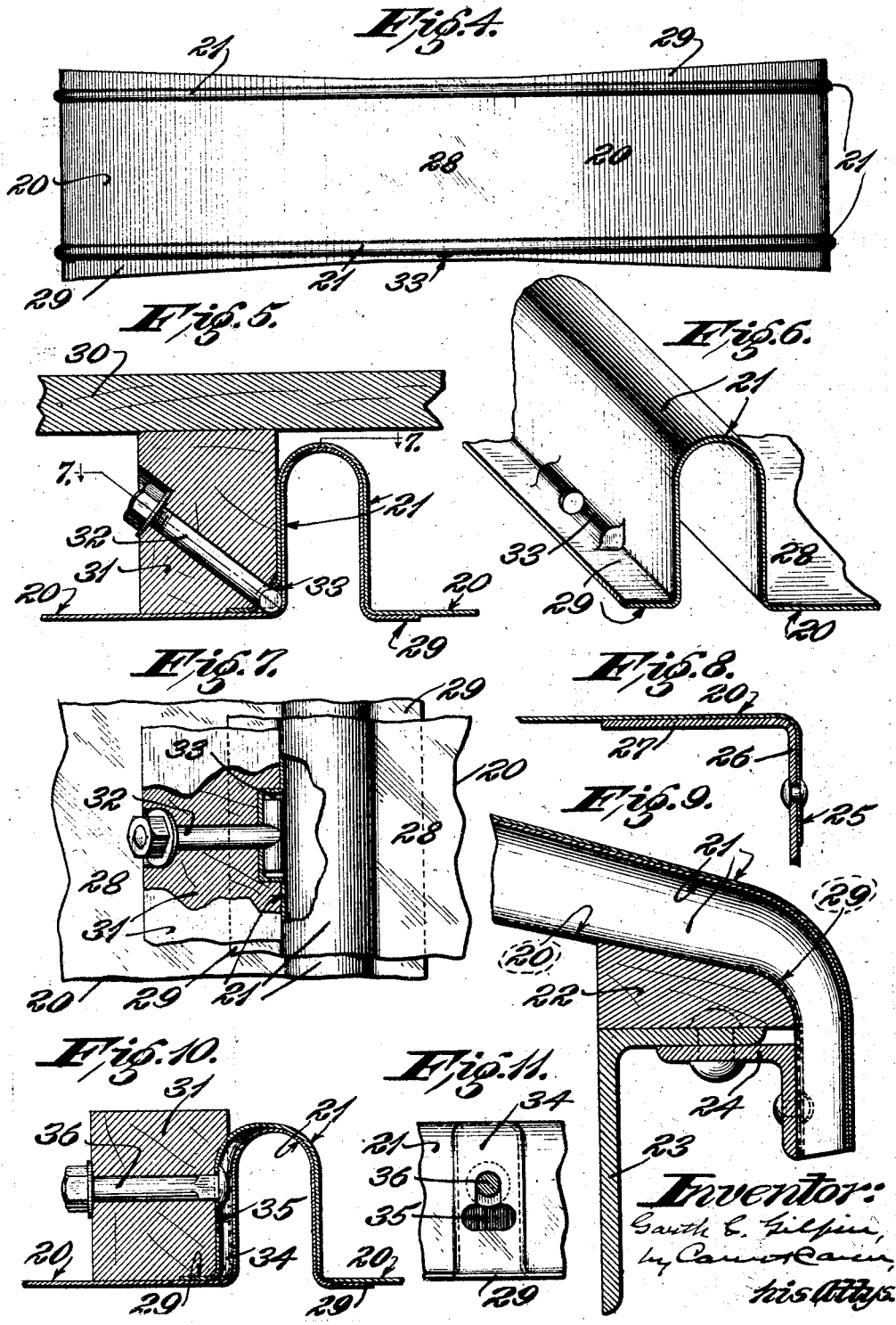

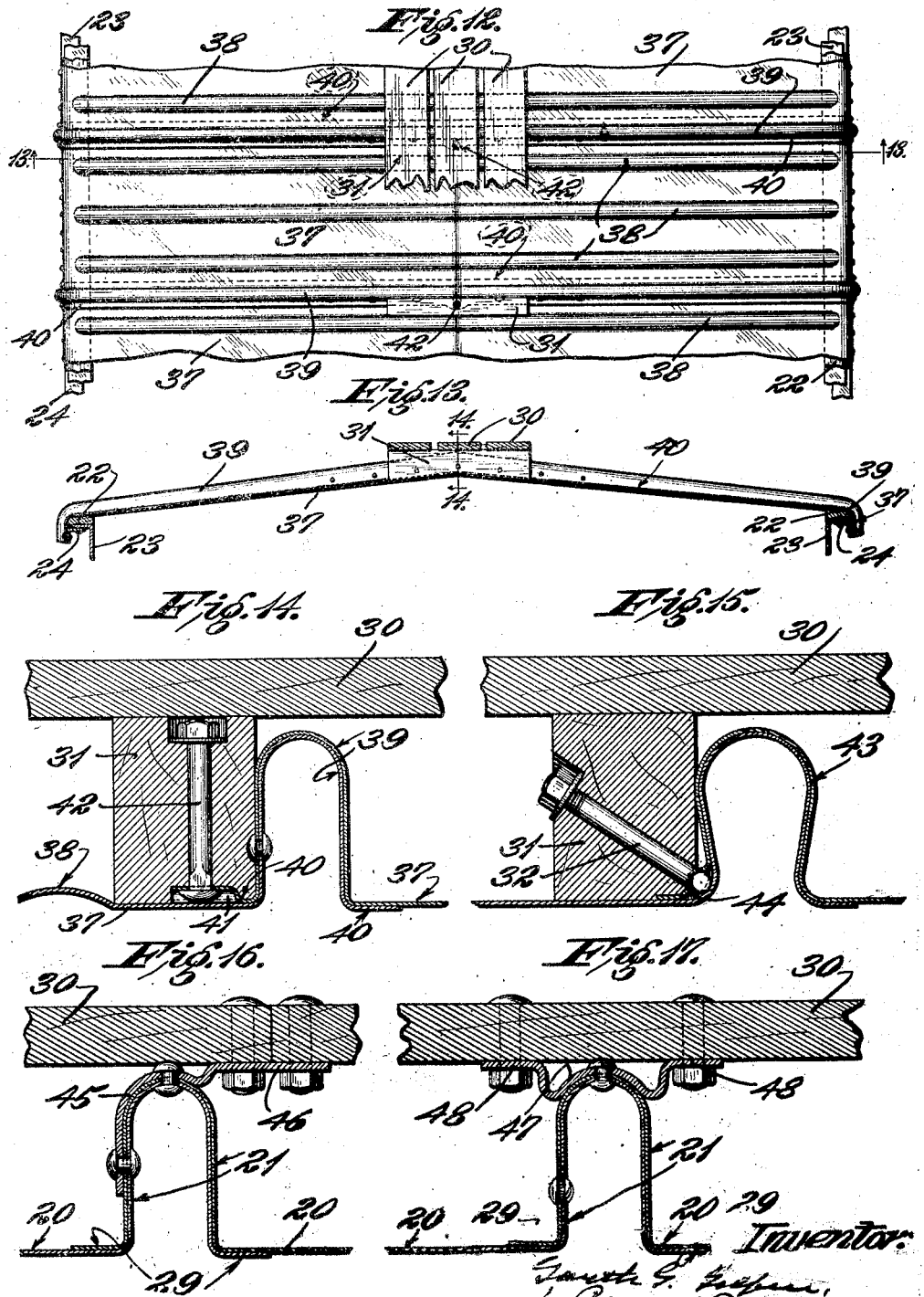

GARTH GRIFFITH GILPIN, OF RIVERSIDE, ILLINOIS, ASSIGNOR TO P. H. MURPHY COMPANY, OF PARNASSUS, PENNSYLVANIA, A CORPORATION OF PENNSYLVANIA.

CAR-ROOF.

1,300,258.                Specification of Letters Patent.        Patented Apr. 15, 1919.

Application filed October 17, 1918. Serial No. 258,528.

*To all whom it may concern:*

Be it known that I, GARTH GRIFFITH GILPIN, a citizen of the United States, residing at Riverside, in the county of Cook and State of Illinois, have invented a certain new and useful Improvement in Car-Roofs, of which the following is a specification.

My invention relates to car roofs and particularly to car roofs of the all-steel type wherein the load-sustaining roof sheets extend from eaves to eaves and are connected along their side margins by hollow seams, which function as carlines.

One of the objects of the present invention is to strengthen the car roof by means of the shape of the overlapping portion of the roof sheets. Another object is to secure effective ventilation of the car, and thus prevent sweating or the accumulation of moisture on the under side of the roof sheets. Another object is to provide a simple means for attaching the running board saddle to the car. Another object is to adapt roof sheets of various lengths to be manufactured with the same set of dies. Other objects are to save material, cheapen the cost of manufacture and application of the roof to the car, to reduce the weight of the same, and to attain advantages hereinafter appearing.

The invention consists in an all metal car roof wherein the roof sheets extend across the car and are connected by hollow seams, which are turned down over the eaves and act as ventilating flues. The invention further consists in the improved form of seam and the means for securing the running board saddle in position on the roof. The invention further consists in the construction and combinations of parts hereinafter described and claimed.

In the accompanying drawings, which form part of this specification, and wherein like symbols refer to like parts wherever they occur, Figure 1 is a plan view of the end portion of a car roof embodying my invention, parts being broken away to more clearly illustrate the invention;

Fig. 2 is a cross section taken through the roof on the line 2—2 in Fig. 1;

Fig. 3 is a side elevation of the roof shown in Fig. 1;

Fig. 4 is a plan view of one of the roof sheets;

Fig. 5 is an enlarged longitudinal section taken through the roof at the ridge crosswise of a seam on the line 5—5 in Fig. 2 showing the securing bolt for the running board saddle in elevation;

Fig. 6 is a fragmentary perspective view of the side marginal portion of the roof sheet at the ridge showing the recess for the securing bolt in the overlapping rib of the roof sheet;

Fig. 7 is a plan view of the seam at the ridge, the running board saddle and the underlying rib of the roof sheet being shown partly in section on the line 7—7 in Fig. 5;

Fig. 8 is a vertical section through the end of the car on the line 8—8 in Fig. 1, showing the end sheet turned down over the end plate and secured to the same;

Fig. 9 is a cross-section at the eaves of the car taken lengthwise of the seam on the line 9—9 in Fig. 1;

Fig. 10 is a cross-section through a seam and running board saddle showing a modified form of securing bolt;

Fig. 11 is a side elevation of the overlapping rib of the roof sheet shown in Fig. 10, showing the recess for the securing bolt;

Fig. 12 is a plan view of a portion of a car roof showing a modified form of sheet and saddle securing means;

Fig. 13 is a transverse cross-section taken through the roof on the line 13—13 in Fig. 12;

Fig. 14 is an enlarged cross-section taken through the roof at the ridge crosswise of a seam on the line 14—14 in Fig. 13;

Fig. 15 is a cross-section similar to Fig. 14 showing the saddle securing means in connection with a bulb-seam; and Figs. 16 and 17 are cross-sections through the ridge portion of the hollow seams showing two modified forms of metal running board saddles.

The roof illustrated in Figs. 1 to 9 of the drawings comprises transversely arranged load-sustaining roof sheets 20, which extend from eaves to eaves of the car. The roof sheets have upstanding hollow ribs 21 formed therein adjacent to their side margins. The hollow rib of one sheet overlaps the hollow rib of the adjacent sheet, thus forming a hollow seam between the body portion of each sheet, which serves as a carline. The eaves ends of the roof sheets rest on wooden filler strips 22, which are supported on angle iron side plates 23. The horizontal flanges of the angle iron side plates are arranged uppermost and project outwardly. A second angle iron 24 having its horizontal flange arranged uppermost and projecting inwardly is riveted or otherwise secured to the under side of the horizontal flange of each side plate 23. The end portions of the roof sheets are bent downwardly over the side plates and are riveted to the depending flanges of the angle irons 24 secured to the under side of the horizontal flanges of the side plate 23. The lapped hollow ribs 21 of the roof sheets, which constitute the seams extend from end to end of the sheet and form passageways or flues over the side plates having their end portions vertically disposed and open at the bottom which serve to ventilate the car. The side marginal portion of the endmost roof sheet adjacent to the car end is flanged downwardly as at 25, and is securely riveted to the metal end plate 26 of the car which is provided with an inwardly projecting horizontal flange 27 for supporting the roof sheet.

The roof sheets are arched and provided with a flat horizontal portion 28 at their middle, the purpose of which will be hereinafter more fully described. The lapped hollow ribs 21 of the roof sheets, which constitute the carlines and form the ventilating passageways, are of varying height being highest at the middle of the car and decreasing in height toward the eaves.

The side marginal portions 29 of the roof sheets located outside of the upstanding hollow ribs are of greater width at the eaves than at the ridge by reason of the decreasing height of the hollow ribs toward the eaves. The tapering of the ribs permit use of all the metal in the sheets, and as the seam decreases in height toward the eaves, the width of the side marginal portions 29 of the roof sheets will increase correspondingly toward the eaves. The side marginal portions of the overlapping sheet rests on the body portion of the adjacent underlapping sheet and the side marginal portion of the underlapping sheet is disposed underneath the body portion of the adjacent overlapping sheet. The side marginal portions of the sheets being wider at the eaves than at the ridge and the lapping of these portions with the body portions of adjacent sheets, results in a double thickness of metal on each side of the seam which acts as a gusset. This greatly strengthens the roof, and allows more material for riveting the lapped side marginal portion and the adjacent body portion of the sheet to the side plate.

The wooden running boards 30 are fastened to wooden running board saddles 31, which are supported on the flat horizontal portions 28 of roof sheets and a ed alongside of each seam. These running board saddles rest on the overlapping side marginal portions of the sheets and are secured in position on the roof by means of T-bolts 32. At the angle formed by the side marginal portion and the outside wall of the overlapping hollow rib, the roof sheet is provided with a recess 33 adapted to receive the head of the T-bolt 32. This bolt extends diagonally upwardly from the recess 33 through the running board saddle to the opposite face of said saddle and is provided with a securing nut threaded on its end portion, which is located in a counter bore in the running board saddle. One of the advantages of the flat horizontal portion 28 formed in the center of the sheet is that it furnishes a better bearing for the running board saddles. Another advantage in a sheet having a flat middle portion is that it eliminates special cutting and shaping of the under side of the running board saddles, which is necessary in the circle and double pitch type of roof. Another advantage in the radial sheet with a flat portion in its middle is that one set of radial dies can be used in forming the sheets for cars of different widths by using filler blocks of different lengths to increase or decrease the length of the dies.

In the modification shown in Figs. 10 and 11 of the drawings, the outside vertical wall of the upstanding hollow rib of the roof sheet is provided with a bossed portion 34 having a T-slot 35 formed therein adapted to receive the head of a carriage bolt 36 which extends horizontally through the running board saddle 31.

In the modification shown in Figs. 12 to 14 of the drawings, a double pitch type of roof is shown. The roof sheets 37 are provided with spaced stiffening corrugations 38, which terminate short of the eaves. The seams are formed by lapped hollow ribs 39 formed in the sheets 37 adjacent to their side margins, which decrease in height toward the eaves and are similar to the ribs 21 of the roof shown in Figs. 1 to 9 of the drawings. The outside wall of the upper hollow rib is riveted or otherwise secured to the adjacent inside wall of the under hollow rib for a distance on each side of the center of the car. The side marginal portions 40 of the roof sheets are of the same width throughout. The adjacent side marginal portions 40 of the overlapping rib is offset upwardly to form a recess 41, which is adapted to receive the head of a vertically arranged carriage bolt 42. The carriage bolt 42 extends vertically upwardly through a hole in the recess and the running board saddle, and has a securing nut on its upper end which is located in a counter bore in the upper surface of the running board saddle.

In the modification shown in Fig. 15, the T-bolt 32 is shown in connection with a bulb seam 43. The outer rib of the bulb seam has a recess 44 for receiving the head of the T-bolt similar to the recess 33 shown in Fig. 5.

In Fig. 16, a metal running board support 45 having a horizontal portion 46 to which the running boards are secured, is shown riveted to the seam. This support extends down alongside of the outside wall of the overlapping rib, fitting against and being riveted to the top and one side of the seam so as to hold the seam members together. The modified form of metal running board support 47 shown in Fig. 17 has a middle portion adapted to embrace the top portion of the seam, and is riveted thereto. The support is provided with oppositely disposed horizontal flanges 48 offset upwardly to which the running boards are fastened by bolts.

From the foregoing described arrangement, it is evident that the lapping of the roof sheets which extend from eaves to eaves of the car and are securely riveted to the side and end plates, together with the seam flanges and the lateral tapering base of the seam flanges located outside of the seam, greatly strengthen the roof. The lateral tapering base flanges act as gussets and stiffen the seams against vertical loads and also tend to resist any tendency of the seam to twist or spread. The lapped hollow ribs, which function as outside carlines, and the tapering side marginal portions form a rigid brace from side plate to side plate, and prevent spreading of the side plates or movement of the side plates endwise with respect to each other. The bending down of the lapped hollow ribs over the eaves of the car form flues or ventilators on both sides of the car at every seam. These ventilating flues being open to the atmosphere at the bottom provide for ventilation of the interior of the car and thus tend to prevent the sweating of the under side of the roof sheets. The downwardly opening ventilating flues also prevent rain from entering the car. The running board saddles are securely fastened to the roof by means of the securing bolts, which are easily attached to the roof sheet. The openings in the roof sheets for the securing bolts are in the upper sheet only and do not affect the waterproofing qualities of the roof.

I claim the following as my invention:

1. A car roof comprising a plurality of metal roof sheets extending from eaves to eaves, the side margins of the respective sheets being lapped to form seams, the extent of the sheet lap being greater at the eaves than at the ridge.

2. A car roof comprising metal roof sheets extending from eaves to eaves and having lapped hollow ribs in their marginal portions, the portion of the overlapping sheet beyond the rib being disposed above the body portion of the underlying sheet and being wider at the eaves than at the ridge, and the portion of the underlapping sheet beyond its rib being disposed underneath the body portion of the overlapping sheet and being wider at the eaves than at the ridge.

3. A car roof comprising metal roof sheets extending from eaves to eaves and having inverted U-shaped ribs formed near their side margins and arranged to overlap each other to form hollow seams, the end portions of the roof sheets being bent down beyond the side walls of the car and rigidly secured thereto, the portion of the sheet located beyond the U-shaped ribs thereof being wider at the eaves than at the ridge.

4. A car roof comprising metal roof sheets having overlapped upstanding hollow ribs adjacent to their side margins, the side marginal portion of the sheet located outside of the overlapping rib being wider at the eaves than at the ridge, the outside wall of the overlapping hollow rib and the inside wall of the underlapping rib being secured together for a suitable distance on each side of the ridge.

5. A car roof comprising a plurality of metal roof sheets extending from eaves to eaves, the side margins of the respective sheets being lapped to form seams, the extent of lap of the sheets being greater at the eaves than at the ridge, the lapped portion of the sheets being secured together for a suitable distance on each side of the ridge.

6. In a car roof comprising metal roof sheets having recesses formed therein, running board saddles supported on said roof sheets, and securing members for securing the running board saddles, said securing members having head portions in said recesses and body portions extending through the running board saddles.

7. In a car roof comprising metal roof sheets lapped to form seams having recesses formed therein, running board saddles supported on said roof sheets adjacent to said seams, bolts having head portions located in said recesses, said bolts extending through the upper member of the seam and running board saddles.

8. In a car roof comprising metal roof sheets extending from eaves to eaves and having lapped hollow ribs in their side margins to constitute seams, the outer portion of the overlapping rib of each sheet having a recess formed therein located above the under sheet, running board saddles supported on said roof sheet adjacent to the respective seams and securing bolts having their head portions mounted in the recesses formed in the overlapping hollow rib of the seams, said bolts extending through the running board saddles and being secured to the same by nuts.

9. As an article of manufacture, an arched roof sheet for a car roof having its middle portion flat, said sheet having a portion near each side margin formed into a hollow rib and being of greater width at its ends than at its middle.

10. As an article of manufacture, a roof sheet for a car roof having a portion near each side margin formed into a hollow rib and the portion beyond each of said hollow ribs being of greater width at the ends of the sheet than at its middle.

11. As an article of manufacture, a roof sheet for a car roof, said roof sheet being pressed from a sheet of metal of uniform width and having a portion near each of its side margins formed into a hollow rib whose depth decreases from the middle of the sheet toward each end to produce a sheet of greater width at its ends than at its middle.

12. As an article of manufacture, a roof sheet for a car roof having a portion near its side margins formed into a hollow rib whose height decreases from the middle of the sheet toward each end, the body portion of the sheet and the hollow ribs formed therein being turned down into a substantial vertical position, the portion of the sheet located outside of each of said hollow ribs being wider at the ends of the sheet than its middle.

Signed at Chicago, Illinois, this 11th day of October, 1918.

GARTH GRIFFITH GILPIN.